United States Patent [19]

Bassick et al.

[11] Patent Number: 5,003,630
[45] Date of Patent: Apr. 2, 1991

[54] PRESSURE GARMENT

[75] Inventors: John W. Bassick, Paxton; Edward A. Dubois, Auburn, both of Mass.

[73] Assignee: David Clark Company Incorporated, Worcester, Mass.

[21] Appl. No.: 424,994

[22] Filed: Oct. 23, 1989

[51] Int. Cl.⁵ .............................................. B64D 10/00
[52] U.S. Cl. .................................................... 2/2.1 A
[58] Field of Search ............................ 2/2.1 A, 2.1 R; 441/102–105

[56] References Cited

U.S. PATENT DOCUMENTS 3,521,628  7/1970  Piel ................................. 128/201.27
3,740,764  6/1973  Elfstrom et al. ...................... 2/2.1 R
4,194,041  3/1980  Gore et al. ............................ 428/315
4,234,637  11/1980 Sewell et al. ......................... 428/131
4,242,769  1/1981  Rayfield et al. .......................... 2/79

Primary Examiner—William A. Cuchlinski, Jr.
Assistant Examiner—W. Morris Worth
Attorney, Agent, or Firm—Samuels, Gauthier & Stevens

[57] ABSTRACT

A pressure garment has one or more bladders defined by flexible micro-porous material consisting of at least two layers, one layer being hydrophilic and facing inwardly towards the wearer's body, and the other layer being hydrophobic and facing outwardly away from the wearer's body.

5 Claims, 1 Drawing Sheet

PRESSURE GARMENT

BACKGROUND OF THE INVENTION

1. Field of the Invention

This invention relates to an improvement in pressure garments, examples of which are full and partial pressure suits, anti-G suits, torso counter pressure garments, etc. of the type worn by crew members in high performance high altitude aircraft and space vehicles.

2. Description of the Prior Art

The known pressure garments of the above-described type conventionally employ impervious, solid film or solid coating laminate materials for retention of gases under pressure. Examples of such materials include neoprene and urethane. While such materials are effective gas barriers, they are also effective water vapor barriers which inhibit natural dissipation of the wearer's metabolic heat output via perspiration evaporation. In order to offset the resulting discomfort and reduction in performance due to heat stress, in many cases it has become necessary to integrate complex and burdensome cooling systems into the pressure garments.

In the totally unrelated field of all-weather garments, it is known to employ flexible micro-porous materials of the type disclosed for example in U.S. Pat. No. 4,194,041 (Gore et al.) granted on Mar. 18, 1980. As described in this patent, the disclosure of which is incorporated herein by reference, such micro-porous materials include an interior hydrophilic layer and an exterior hydrophobic layer. The hydrophilic layer prevents flow of gases or liquids through open pore channels, but permits the transfer therethrough of substantial amounts of water by absorbing water on the side facing the wearer's body where there is a high concentration of water vapor, and desorbing or evaporating water on the opposite side where water vapor concentration is relatively lower. The exterior hydrophobic layer is porous and permeable to gases, but does not permit water to spread on its surface and wick into its porous structure. Such micro-porous materials have been employed extensively in a wide range of outer garments, including rainwear, windbreakers, jogging suits, etc.

SUMMARY OF THE INVENTION

The present invention stems from the discovery that, when properly seamed to prevent leakage, flexible micro-porous materials of the above-described type can be used to fabricate aerospace crew protective pressure garments which will both retain the gas pressure required for proper garment functioning, and still facilitate the transmittance of metabolic heat (water vapor) through the garment to the surrounding environment.

In the "full pressure" mode, a single ply of the flexible micro-porous material is configured and seamed to completely envelop the wearer's body in a pressure bladder. Preferably, the bladder is restrained externally against outward expansion by an outer covering of woven fabric or the like. By pressurizing the bladder, appropriate pressure is applied to the wearer's body. Gas containment is effected by the hydrophilic layer of the micro-porous material. Water vapor at the body surface is allowed to pass through the micro-porous material and, in turn, through the woven restraint fabric to the surrounding environment. Thus, heat stress is avoided without having to resort to supplemental cooling systems. Additional layers of fabric materials may be employed, separately or as laminates with the micro-porous material, to provide improved comfort and/or durability, as required.

In the "partial pressure" mode, multiple plys of micro-porous material are seamed together to provide pressure bladders strategically located adjacent to selected body surfaces. Here again, such bladders are preferably externally restrained by fabric layers. Although resistance to water vapor transmission increases with the addition of each ply of micro-porous material, there is still a worthwhile reduction in heat stress as copared to conventional garments which employ pressure bladders fabricated of solid film materials.

DESCRIPTION OF ILLUSTRATED EMBODIMENTS

Figure 1:
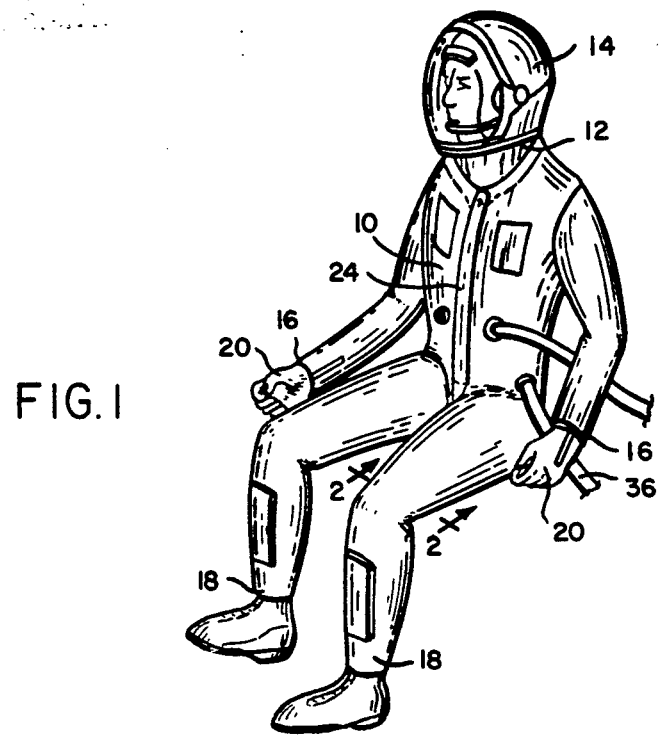
FIG. 1 is a perspective view of a typical high altitude pressure garment.

With reference initially to FIG. 1, a typical high altitude pressure suit is shown at 10. The suit is essentially of one piece construction, with a collar portion 12 adapted to detachably receive a helmet 14 containing conventional breathing and communication apparatus (not shown), and with cuff connections 16 located at the ends of the sleeve portions for connection to gloves 20. A slide fastener 24 which may be on the front side as herein illustrated, or on the back side, accommodates donning and doffing of the suit. The foregoing features are well known to those skilled in the art, and thus do not require further description.

Figure 2:
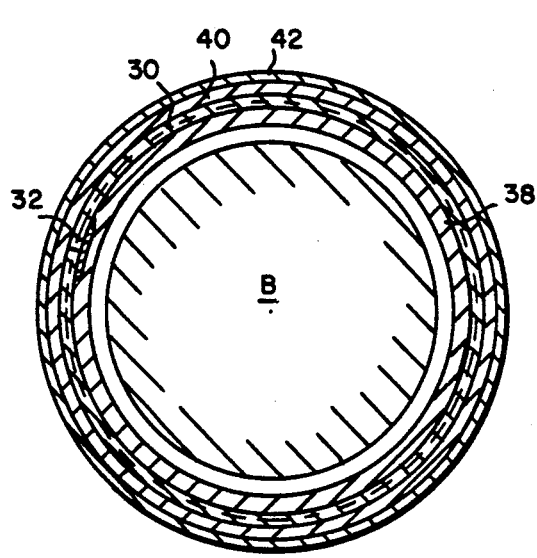
FIG. 2 is a sectional view taken along line X—X and showing the present invention employed in a full pressure mode.
Figure 4:
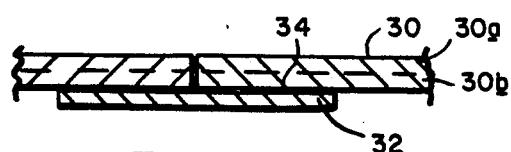
FIG. 4 is an enlarged sectional view of a typical seam in accordance with the present invention.

As previously noted, pressure suits can either be of the full pressure or partial pressure type. A typical full pressure suit application is illustrated in FIG. 2. Here, the wearer's body "B" is located within and enveloped by a pressure bladder 30 of pliable micro-porous material, which may for example be of the type disclosed in the previously referred to U.S. Pat. No. 4,194,041. With additional reference to FIG. 4, it will be seen that the micro-porous bladder material consists of at least two layers 30a 30b. The innermost layer 30a is hydrophilic and faces inwardly towards the wearer's body. The outermost layer 30b is hydrophobic and faces outwardly away from the wearer's body.

The edges of the micro-porous bladder material are arranged adjacently and are overlapped by a flexible tape 32, typically made from MIL-C-83489 material of type supplied for example by Kenyon Dye Works, Inc. of Kenyon, R.I. The tape is adhered to the micro-porous material by means of a thermosetting adhesive 34, an example being that sold by United Shoe Machine Company of Cambridge, Massachusetts and identified by Vendor No. 7376.

Pressurized air may be admitted to the bladder interior by any convenient means, typically via a hose connection attached to the suit at a convenient location, for example as indicated at 36 in FIG. 1.

The pressure suit 10 will normally include additional material layers on opposite sides of the micro-porous bladder material 30. Typically, these will include an inner liner 38 of nylon or the like to improve comfort and to safeguard the bladder material from abrasive damage during donning and doffing of the suit, a woven restraining layer 40 of nylon or the like to resist outward expansion of the bladder, and an outer covering 42 of a wear and soil resistant material, typically MIL-C-24500 material supplied by Putnam Mills, Inc. of New York, N.Y. It will be understood that these additional material layers can either be separate from or integral with the micro-porous material.

When inflated, the full pressure suit bladder 30 serves to contain a pressure envelope around the wearer's body. The hydrophilic layer 30a of the micro-porous material effectively contains the pressurized gas admitted into the bladder interior via hose 36. As the wearer perspires, perspiration readily passes through the comfort liner 38, causing the water vapor concentration on the interior of the bladder to build up and eventually exceed the level of water vapor concentration on the exterior of the bladder. When this occurs, water is absorbed on the inside of the hydrophilic layer 30a and desorbed or evaporated on the opposite side. The thus evaporated water readily escapes through the hydrophobic layer 30b and continues on through the restraint and cover materials 40,42.

It will thus be seen that the micro-porous bladder material serves not only to contain the gas pressure required for proper garment functioning, but also to accommodate escape of water occasioned by wearer perspiration. These two seemingly diverse functions unexpectedly coact in providing an effective comfortable garment, without having to resort to complex burdensome cooling systems. Even under the most extreme temperature conditions, auxiliary cooling systems can be abbreviated significantly. The outer hydrophobic layer 30b prevents penetration of water from the exterior and thus provides effective protection in the event of submersion at sea, exposure to the elements, etc.

Figure 3:
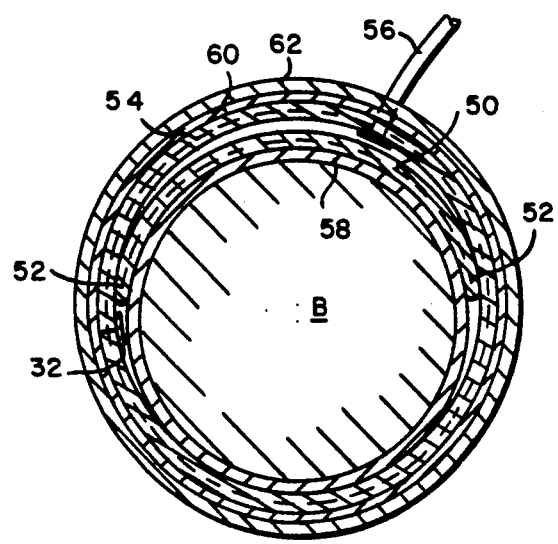
FIG. 3 is a sectional view again taken along line X—X and showing the present invention employed in a typical partial pressure mode.

These benefits are also attainable in partial pressure suit applications of the type illustrated in FIG. 3. Here, a panel 50 of micro-porous material is peripherally seamed as at 52 to the interior surface of an envelope 54 of the same material. The envelope again functions as a protection against exposure to the elements. The envelope 54 and panel 50 define a pressure bladder into which pressurized air is admitted by any convenient means, typically a hose connection 56. The remainder of the suit can again be made up of additional layers having different but related functions, e.g., an inner comfort liner 58, a restraint layer 60 and an outer covering 62.

In the partial pressure mode, correct material orientation is essential. More particularly, both the envelope 54 and panel 50 must be arranged such that their hydrophilic layers face inwardly towards the wearer's body, and their hydrophobic layers face outwardly away from the user's body. In other words, the interior of the chamber will be defined by an outwardly facing hydrophobic layer and an inwardly facing hydrophilic layer. In this way water can pass through the panel 50 into the interior of the bladder, and then from the bladder interior through envelope 54 for continued passage through layers 60 and 62 to the garment exterior.

We claim:

1. In a pressure garment of the type worn by crew members in high performance high altitude aircraft and space vehicles, said garment having a pressure bladder arranged to cover at least a portion of a wearer's body, said pressure bladder being expandable in response to the introduction therein of a pressurized gas to thereby apply pressure to the enveloped portion of the wearer's body, the improvement comprising:

said bladder being defined by flexible micro-porous material consisting of at least two layers, one of said layers being hydrophilic and facing inwardly toward the wearer's body, and the other of said layers being hydrophobic and facing outwardly away from the wearer's body, whereupon pressurized gas introduced into said bladder will be retained therein by the hydrophilic layer of said material, and water vapor from the wearer's body will be permitted to pass through the hydrophilic and hydrophobic layers of said material to the exterior of said garment.

2. The pressure garment of claim 1 wherein the covered portion of the wearer's body is located within and encircled by said bladder.

3. The pressure garment of claim 1 wherein the covered portion of the wearer's body is located exteriorly of said bladder and said bladder is formed by a panel of said material peripherally seamed to an interior surface of an envelope of said material, wherein the hydrophilic layer of said panel and envelope face toward the wearer's body.

4. The pressure garment of claims 2 or 3 further comprising restraining means for resisting expansion of said bladder outwardly away from the covered portion of the wearer's body.

5. The pressure garment of claim 2 or 3 wherein said bladder includes at least one seam defined by abutting edges of said material, said abutting edges being covered by a strip of flexible tape adhered thereto by a thermosetting adhesive.

* * * * *